United States Patent Office 3,401,184
Patented Sept. 10, 1968

3,401,184
METAL ORGANO PHOSPHATE
PREPARATION PROCESS
Anthony J. Revukas, Cranford, N.J., assignor to Cities
Service Oil Company, a corporation of Delaware
No Drawing. Filed Mar. 6, 1964, Ser. No. 350,113
15 Claims. (Cl. 260—429.3)

ABSTRACT OF THE DISCLOSURE

A process for preparing metal organo orthophosphates by contacting at a temperature from about 10° C. to about 120° C., a mixture of phosphorus pentoxide and a polyvalent metal halide in an inert organic solvent with an organic hydroxyl having from 1 to about 30 carbon atoms. Preferably the phosphorus pentoxide and titanium tetrachloride are dispersed in the organic solvent and reacted at a temperature between 10° C. and 60° C. with added ethylhexanol. Subsequent raising of the temperature to between 80° C., and 110° C. results in evolution of the HCl formed yielding as residue titanium (IV) bis [di 2-ethylhexyl) orthophosphate] bis [monoacid mono (2-ethylhexyl) orthophosphate].

---

This invention relates to the preparation of metal organo orthophosphates. More particularly it relates to the preparation of such orthophosphates by reacting an organic hydroxyl compound with a polyvalent metal halide and phosphorus pentoxide.

Metal organo orthophosphates can be prepared by reacting an organic acid orthophosphate with a polyvalent metal halide. The commercially available organic acid orthophosphates are generally mixtures of the mono- and diacid orthophosphates in various proportions and free phosphoric acid is often present as an impurity. A metal organo orthophosphate of reproducible composition is difficult to obtain from the commercially available organic acid orthophosphate reactants. Also, it is often necessary to remove the free phosphoric acid impurity prior to reaction with the polyvalent metal halide.

It has now been found that metal organo orthophosphates can be prepared by reacting an organic hydroxyl containing compound with a polyvalent metal halide and phosphorus pentoxide in an inert organic solvent. The reaction is conducted by simply admixing the reactants at a temperature of from about 10° C. to about 120° C. In the reaction, the halide groups of the metal are displaced to form a salt of the metal with at least two orthophosphate groups whereas the monohydric organic compound completes one or more ester groups on each of the orthophosphate groups attached to the metal. In addition to the ester formation and linkage to the metal, one or more of the phosphate groups can contain an acid group. Hydrogen halide is a by-product of the reaction.

Preparation of the metal organo orthophosphates directly from the raw materials avoids the need of an organic acid orthophosphate intermediate; it reduces the amount of process effort, and affords a process for the preparation of a large variety of metal organo orthophosphates.

The below listed generic equations show typical reactions of the process of this invention wherein R is a hydrocarbon group having from 1 to about 30 carbon atoms X is a halogen, and M is a polyvalent metal:

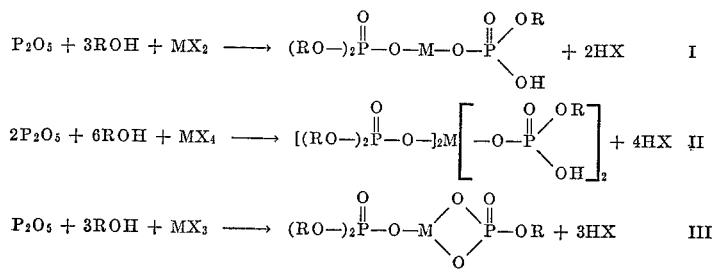

$$P_2O_5 + 3ROH + MX_2 \longrightarrow (RO-)_2\overset{O}{\overset{\|}{P}}-O-M-O-\overset{O}{\overset{\|}{P}}\overset{OR}{\underset{OH}{\diagdown}} + 2HX \quad\quad I$$

$$2P_2O_5 + 6ROH + MX_4 \longrightarrow [(RO-)_2\overset{O}{\overset{\|}{P}}-O-]_2M\left[-O-\overset{O}{\overset{\|}{P}}\overset{OR}{\underset{OH}{\diagdown}}\right]_2 + 4HX \quad\quad II$$

$$P_2O_5 + 3ROH + MX_3 \longrightarrow (RO-)_2\overset{O}{\overset{\|}{P}}-O-M\overset{O}{\underset{O}{\diagdown\diagup}}\overset{O}{\overset{\|}{P}}-OR + 3HX \quad\quad III$$

It can be seen that in the above generic equations: M is divalent in Equation I; M is tetravalent in Equation II; whereas M is trivalent in Equation III. In the above generic equations: metal organo orthophosphates of generic Equation I are referred to as metal (II) [di(hydrocarbyl) orthophosphate] [monoacid mono(hydrocarbyl) orthophosphate]; those of generic Equation II are referred to as a metal (IV) bis [di (hydrocarbyl) orthosphosphate] bis [monoacid mono(hydrocarbyl) orthophosphate]; whereas those of generic Equation III are referred to as metal (III) [di(hydrocarbyl) orthophosphate] [mono(hydrocarbyl) orthophosphate].

Broadly, the polyvalent metal halide employed in this invention can be represented by the formula:

$$R'_{n'}MX_n$$

wherein R' is a hydrocarbon group having from 1 to about 20 carbon atoms, (n) is an integer of 0 to 2, M is a polyvalent metal, X is a halogen and (n) is an integer of at least 2, such as 2 to 4 or 6 and the total of (n) and (n') is equal to the valence of the metal M. Preferably the polyvalent metal halide is one represented by the formula $MX_n$ wherein M is a polyvalent metal having a valence of 2–4, X is a halogen and n is an integer equal to the valence of the metal, i.e. 2–4. Illustratively the metal 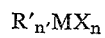 can be one from Group II, Group IV, Group VI and Group VIII of Mandeleeff's Periodic Arrangements of the Elements. A copy of this arrangement, referred to herein as the Periodic Arrangement, can be found on pages 312–313 of the Handbook of Chemistry and Physics, 29th edition (1945). The preferred metals employed in this invention are the tetravalent metals of Group IV which have an automatic number of 22 to 40 such as titanium and zirconium. The halogen can be fluorine, chlorine, bromine or iodine and preferably chlorine.

Illustrative of specific polyvalent metal halides there can be mentioned: magnesium chloride; magnesium fluoride; calcium bromide, zine bromide; zinc chloride; barium chloride; mercuric chloride; stannous chloride; stannic chloride; lead chloride; titanium trichloride; titanium tetrachloride; titanium tetrafluoride; titanium tetrabromide;

titanium tetraiodide; germanium tetrachloride; molybdenum tetrachloride; chromic chloride; zirconium tetrachloride; zirconium tetrabromide; cobaltic chloride; cobaltous chloride; nickel bromide; nickel chloride; dibenzyl tin dibromide; dibenzyl tin dichloride; diethyl tin dibromide; disioamyl tin dichloride; diphenyl tin dibromide; ethyl propyl tin dichloride; ethyl tin triiodide; and the like.

The organic hydroxyl compound can have from 1 to about 30 carbon atoms. Preferably the organic hydroxyl compound is a monohydroxy hydrocarbon which can be represented by the formula R—OH wherein R is a hydrocarbon group having from 1 to 30 carbon atoms and preferably from about 6 to about 22 carbon atoms. The hydroxyl group can be linked to an aliphatic, cycloaliphatic or aromatic hydrocarbon group. The monohydroxy, hydrocarbon can thus be alkanol, alkenol, cycloalkanol, cycloalkenol, phenol, phenalkanol, alkphenol and the like. Preferably the monohydroxy hydrocarbon is alkanol and particularly branched chain alkanol. Illustrative of specific monohydroxy hydrocarbon reactants there can be mentioned: methanol; ethanol; propanol; isopropanol; butanol; isobutanol; 2-ethylhexanol; octanol; nonanol; 4,9-dipropyldodecanol; 2,2,3-trimethylheptanol; 3-ethylnonanol; 2-methyl-5-isopentylhendecanol; dodecanol; 6,7-dipentyldodecanol; 9,12-dimethyleicosanol; oleyl alcohol; linoleyl alcohol; 3-pentene-2-ol; cyclohexanol; 3-isopropylcyclohexanol; 4-decen-1-ol; 4-octylphenol; 4-isopropylphenol; 4 - phenyl - 1-hydroxydodecane; phenol; alpha-naphthol; benzyl alcohol; and the like. In the process of this invention either one or a mixture of organic hydroxyl compounds can be employed. Also, the hydrocarbon portion of the hydroxyl containing organic compound can be substituted with various groups which do not interfere with the reaction. Illustrative of substituent groups on the hydrocarbon group there can be mentioned nitro groups, such as in nitroalkanols, e.g. nitroethanol, and ammonium groups such as in ammonium alkenols, e.g. the lauric acid salt of ethanolamine.

The temperature employed in the process of this invention can vary over a wide range such as that of from about 10° C. to about 120° C., preferably from about 20° C. to about 110° C. and particularly from about 25° C. to about 105° C.

The molar ratio of the reactants employed in the process of this invention can vary over a wide range such as that of from about 0.1 to 5 moles of phosphorus pentoxide and from about 1 to about 10 moles of the organic hydroxyl compound per mole of the metal halide and preferably from about 0.5 to 3 moles of phosphorus pentoxide and 2 to 8 moles of the organic hydroxy compound per mole of the metal halide. The optimum molar ratio will, of course, vary with the particular reactants and particularly with the number of halogens attached to the metal, as can be seen from the hereinabove generic Equations I–III. It is preferred that the organic hydroxyl compound be added to a mixture of the metal halide and phosphorus pentoxide in an inert organic solvent at a temperature not higher than about 60° C. such as that of from about 10° C. to about 60° C. Addition of the organic hydroxyl compound to a mixture of phosphorus pentoxide and the metal halide is preferred since it minimizes reaction of the metal halide directly with the organic hydroxyl compound. Reaction of the metal halide and organic hydroxyl compound eliminates available reaction sites on the metal for the phosphate due to formation of a metal salt of the hydroxyl reactant. The initial contact of the hydroxyl reactant with the mixture of phosphorus pentoxide and metal halide is preferably at a temperature no higher, or below, 60° C. to prevent unduly rapid reaction rates. After the organic hydroxyl compound has been admixed with the phosphorus pentoxide and metal halide, the reaction is preferably completed by raising the reaction temperature, e.g. from about 80° C. to the maximum temperatures of the reaction hereinbefore set forth, such as about 110° C. Also, it is desirable to provide means for removing the hydrogen halide formed in the reaction. In adding the organic hydroxyl compound to the mixture of phosphorus pentoxide and metal halide, a stoichiometric excess of the hydroxyl reactant can be employed in order to improve the yield of desired end product. However, a large excess such as that of more than 1.5 or twice the calculated molar ratio of hydroxyl compound for the particular reaction is preferably avoided since it may be desirable to later separate the excess hydroxyl compound from the reaction mixture in order to recover the desired reaction product.

The reaction time in the process of this invention is not critical. Thus it can vary from less than about half an hour to two or three days and preferably from about 2 or 3 hours to a day or two.

The metal organo orthophosphates can be recovered from the reaction mixture by conventional techniques such as fractional distillation, chromatographic absorption and the like. However, it is possible, although not generally desirable, to use the products without separation from the reaction mixture as additives to hydrocarbon fuels or mineral lubricating oils.

Suitable inert organic solvents for the process of this invention include various classes of compounds such as hydrocarbons, halogenated hydrocarbons and others. By the expression "inert" it is mean that the solvent is inert to the reactants and reaction products under the reaction conditions. Suitable solvents include benzene, toluene, p-xylene, o-xylene, m-xylene, hexane, heptane, octane, cyclohexane, methylcyclohexane, chlorobenzene, carbon tetrachloride, ethyl ether, tetrahydrofurane, and the like. Preferred organic solvents are the normally liquid hydrocarbons such as the various aromatic, aliphatic and cycloaliphatic hydrocarbons.

In a preferred method for operating the invention the equipment used in the reaction should be immune to attack by gaseous hydrogen halide. The reaction vessel should be equipped with a heater, a mechanical stirrer, a pressure equalizing addition vessel, a reaction temperature indicator, and an inlet for compressed dry air to displace by-product hydrogen halide through a reflux condenser that does not permit entry of moisture from the outside. It is highly desirable to maintain a water-free atmosphere in the reactor. Two moles of phosphorus pentoxide is dispersed uniformly by means of mechanical agitation in a hydrocarbon solvent such as anhydrous n-heptane in the reaction vessel. One mole of tetravalent metal halide is added next with enough stirring to prevent agglomeration of the materials. Finally six moles of monohydroxy hydrocarbon, in the pressure equalizing addition vessel, is added at a rate to produce a steady evolution of gaseous hydrogen halide. It is preferred to keep the temperature of the reactants below about 60° C. during this step. When the addition is completed, the temperature of the reactants is raised from about 80° C. to about 105° C. If evolution of by-product hydrogen halide begins to moderate, dry air is passed through the solution to hasten the displacement of the acid vapor in order to promote the reaction. As soon as the liberation of hydrogen halide is completed, the n-heptane and any unreacted hydroxyl compound are removed by distillation in vacuo. The residue in the vessel is the desired metal organo acid orthophosphate which can be obtained in 95% to 99% yield based on metal halide used.

The metal organo orthophosphates prepared by the process of this invention have utility as additives in hydrocarbon fuel compositions, e.g. gasoline. When used in gasoline, small quantities of the metal organo orthophosphates, e.g. 100 parts per million based on the weight of the gasoline composition, impart rust inhibition, surface ignition suppression, carburetor detergency, carburetor icing alleviation, and reduction in octane requirement increase to the gasoline composition. Also, owing to their ability to reduce static friction the metal organo orthophosphates have utility as anti-wear agents in mineral oil lubricants wherein they can be employed in concentrations of about 1% by weight of the composition. It is, however, desirable that the metal organo orthophosphates which have a free acid group, e.g. those of the hereinabove described generic Equations I and II, be neutralized with an organic amine prior to their use as hydrocarbon additives. Illustratively, the free acid groups can be neutralized at about 30° C. by contact with oleyl amine.

Illustrative of organo metal orthophosphates produced by the reaction of the hereinbefore described generic Equation I there can be mentioned: nickel (II) [di(2-ethylhexyl) orthophosphate] [monoacid mono(2-ethylhexyl) orthophosphate]; nickel (II) [di(4-octylphenyl) orthophosphate] [monoacid mono(4-octylphenyl) orthophosphate]; cobalt (II) [di(2-ethylhexyl) orthophosphate] [monoacid mono(2-ethylhexyl) orthophosphate]; lead (II) [di(2-ethylhexyl) orthophosphate] [monoacid mono(2-ethylhexyl) orthophosphate]; barium (II) [di(2-ethylhexyl) orthophosphate] [monoacid mono(2-ethylhexyl) orthophosphate]; calcium (II) [di(2-ethylhexyl) orthophosphate] [monoacid mono(2-ethylhexyl) orthophosphate]; magnesium (II) [di(2-ethylhexyl) orthophosphate] [monoacid mono(2-ethylhexyl) orthophosphate]; magnesium (II) [di(4-octylphenyl) orthophosphate] [monoacid mono(4 - octylphenyl) orthophosphate]; and the like.

Illustrative of metal organo orthophosphates which can be prepared in accordance with the hereinbefore described generic Equation II, there can be mentioned: titanium (IV) bis[di(2-ethylhexyl) orthophosphate] bis[monoacid mono (2-ethylhexyl) orthophosphate] titanium (IV) bis[di(4-octylphenyl) orthophosphate] bis[monoacid mono(4 - octylphenyl) orthophosphate]; titanium (IV) bis[di(ethyl) orthophosphate] bis[monoacid mono(ethyl) orthophosphate]; titanium (IV) [di(n-dodecyl) orthophosphate] bis[monoacid mono(n-dodecyl) orthophosphate]; titanium (IV) bis[di(oleyl) orthophosphate] bis[monoacid dioleyl orthophosphate]; titanium (IV) bis[dibenzyl orthophosphate] bis[monoacid monobenzyl orthophosphate]; zirconium (IV) bis[di(2 - ethylhexyl) orthophosphate] bis[monoacid mono(2-ethylhexyl) orthophosphate]; zirconium (IV) bis[di(4 - octylphenyl) orthophosphate] bis[monoacid mono(4-octylphenyl) orthophosphate]; zirconium (IV) bis[dioleyl orthophosphate] bis[monoacid (monoleyl) orthophosphate]; titanium (IV) bis[di(cyclohexyl) orthophosphate] bis[monoacid mono(cyclohexy) orthophosphate]; titanium (IV) bis[di(cresyl) orthophosphate] bis[monoacid mono(cresyl) orthophosphate]; titanium (IV) bis[di(eicosyl) orthophosphate] bis[monoacid mono(eicosyl) orthophosphate]; titanium (IV) bis[mono (isobutyl) mono(4 - octylphenyl) orthophosphate] [monoacid mono (isobutyl) orthophosphate] [monoacid mono(4-octylphenyl) orthophosphate]; stannic (IV) bis[di(2-ethylhexyl) orthophosphate] bis[monoacid mono(2 - ethylhexyl) orthophosphate]; stannic (IV) bis[di(4 - octylphenyl) orthosphosphate] bis[monoacid mono(4-octylphenyl) orthophosphate]; germanium (IV) bis[di(2 - ethylhexyl) orthophosphate] bis[monoacid mono(2-ethylhexyl) orthophosphate]; and the like. Illustrative of mental organo orthophosphates which can be prepared by the reaction shown in the hereinbefore generic Equation III with a trivalent metal there can be mentioned: titanium (III) [di(2-ethylhexyl) orthophosphate]; [mono(2-ethylhexyl) orthophosphate]; titanium (III) [di(4-octylphenyl) orthophosphate] [mono(4-octylphenyl) orthophosphate]; zirconium (III) [di(2-ethylhexyl) orthophosphate] [mono(2-ethylhexyl) orthophosphate]; cobaltic (III) [di(oleyl) orthophosphate] [mono (oleyl) orthophosphate]; and the like.

EXAMPLE 1

Titanium (IV) bis[di(2-ethylhexyl) orthophosphate] bis[mono(2-ethylhexyl) monoacid orthophosphate] is obtained from the reaction of 2 moles of phosphorous pentoxide and one mole of titanium tetrachloride with 6 moles of 2-ethyl-1-hexanol as shown below:

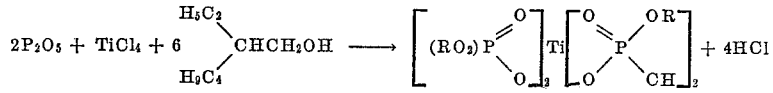

wherein R is 2-ethylhexyl.

To a suitable reaction vessel equipped with a mechanical stirrer, stoppered pressure equalizing addition funnel, thermometer, gas inlet tube, and a reflux condenser protected with a drying tube, there were added 400 ml. of anhydrous n-heptane and 71.0 g. (0.5 mole) or phosphorus pentoxide. With the stirrer going at a rate to insure a uniform dispersion 47.4 g. (0.25 mole) of titanium tetrachloride was added next. Finally 215 g. (1.65 moles) of 2-ethyl-1-hexanol, contained in the pressure equalizing addition funnel, was run into the reaction vessel at a rate such that the temperature of the reactants did not rise above 60° C. When this step was completed, the solution was homogeneous. The reactants were then heated at 98°–103° C., and when evolution of hydrogen chloride moderated, dry air was passed through the solution to displace the acid gas more rapidly and to accelerate the reaction. When further evolution of hydrogen chloride was no longer observed, as revealed by Congo red indicator, the n-heptane and any unreacted octanol were removed by distillation in vacuo. The final temperature of the residual product in the reaction vessel was 175° at 25 mm. A very pale yellow syrupy product was obtained weighing 275.0 g., which is 99% of theory based on the metal halide. Inspection data were as follows:

| | |
|---|---|
| Calculated formula weight for TiC$_{48}$H$_{104}$P$_4$O$_{16}$ | 1109.15 |
| Calculated, percent: | |
| Titanium | 4.32 |
| Phosphorous | 11.17 |
| Found, percent: | |
| Titanium | 4.37; 4.30 |
| Phosphorus | 11.24; 11.15 |
| Refractive index, $n_D^{20}$ | 1.4750 |
| Density, $d_{20}$ | 1.0836 |
| Viscosity, SUS @: | |
| 100° F. | 10,804 |
| 210° F. | 665.5 |
| ASTM color | ½ |

EXAMPLE 2

In the manner described in Example 1 a mixture of two moles (284 g.) of P$_2$O$_5$ and one mole (233 g.) of zirconium tetrachloride in anhydrous n-heptane is reacted with a blend of 3.1 moles (96 g.) of methanol and 3.1 moles (404 g.) of 2-ethylhexanol to produce zirconium (IV) bis[mono (methyl) mono(2-ethylhexyl) orthophosphate] [monoacid mono (2-ethylhexyl) orthophosphate] [monoacid mono(methyl) orthophosphate].

EXAMPLE 3

In the manner described in Example 1,142 g. (1 mole) of P$_2$O$_5$ and 130 g. (1 mole) of anhydrous nickel chloride are dispersed uniformly in 1500 ml. of dry octane. Four hundred and thirty grams (3.3 moles) of 2,2,4-trimethyl-1-pentanol is added. The reaction mixture is heated at 105° C. until evolution of HCl stops. The solvent is removed by distillation in vacuo, the final temperature being 170° at 25 mm. pressure. The product is, nickel (II) [di(2,2,4-trimethyl-1-pentyl) orthophosphate]; [monoacid mono(2,2,4-trimethyl-1-pentyl) orthophosphate].

EXAMPLE 4

Phosphorus pentoxide 71.0 g. (0.5 mole) and 65.1 g. (0.25 mole) of stannic chloride are dispersed in 500 ml. of toluene. A blend, consisting of 103 g. (0.5 mole) of octyl phenol and 74.1 g. (1 mole) of isobutanol, is added to the toluene dispersion in the manner described in Example 1. When evolution of hydrogen chloride is completed upon heating the reaction solution at 100° C., the solvent is removed by distillation at reduced pressure. The product can be represented by the following formula:

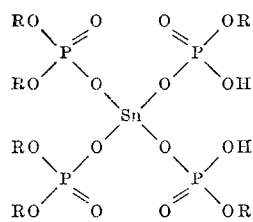

wherein four of the R groups are isobutyl $(CH_3CH(CH_3)CH_2-)$ and the two remaining R groups are octylphenyl $[(CH_3)_3CCH_2C(CH_3)_2C_6H_5-]$ in accordance with the stoichiometrical amounts required and used in the reaction.

EXAMPLE 5

To a well stirred and dispersed mixture of 14.2 g. (0.1 mole) of $P_2O_5$ and 37.2 g. (0.1 mole) of dibenzyltin dichloride in 200 ml. of anhydrous n-heptane, there is added 18 g. (0.3 mole) of anhydrous isopropanol. When no more HCl is liberated at 98° C. the solvent is removed by distillation at reduced pressure, the final temperature being 150° C. The product is dibenzyltin bis [monoacid mono(isopropyl) orthophosphate] of the formula:

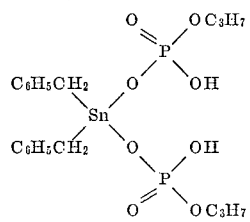

EXAMPLE 6

Following the procedure of Example 1, the corresponding phenyl, benzyl, and cyclohexyl metal organo orthophosphates can be prepared by simply substituting the stoichiometric equivalent quantity of phenol, benzyl alcohol and cyclohexanol respectively for the 2-ethylhexanol employed in Example 1.

What is claimed is:

1. A process for preparing a metal organo orthophosphate which comprises: (a) contacting, in an inert organic solvent, phosphorus pentoxide; and (b) a polyvalent metal halide of the formula $MX_n$ wherein M is a polyvalent metal, selected from the group consisting of magnesium, calcium, zinc, barium, mercury, lead, titanium, germanium, molybdenum, chromium, zirconium, cobalt, nickel and tin, X is a halogen and $n$ is equal to the valence of the metal M; with (c) a monohydroxy hydrocarbon having from 1 to about 30 carbon atoms at a temperature of from about 10° C. to about 120° C.

2. A process of claim 1 wherein the monohydroxy hydrocarbon is alkanol having from about 6 to about 22 carbon atoms and is added at a rate to produce a steady evolution of gaseous hydrogen halide.

3. A process of claim 1 wherein the metal is tetravalent titanium.

4. A process for preparing a metal organo orthophosphate which comprises: (a) contacting, at a temperature of from about 20° C. to about 110° C., a monohydroxy hydrocarbon having from 1 to about 30 carbon atoms; with (b) a mixture of titanium tetrachloride and phosphorus pentoxide in an inert organic solvent.

5. The process of claim 4 wherein from about 0.5 to about 3 moles of phosphorus pentoxide and from about 2 to about 8 moles of monohydroxy hydrocarbon are contacted with each mole of titanium tetrachloride.

6. The process of claim 5 wherein the monohydroxy hydrocarbon is alkanol.

7. The process of claim 5 wherein the monohydroxy hydrocarbon is phenylalkanol.

8. A process for preparing a metal organo orthophosphate which comprises: (a) contacting, at a temperature of from about 20° C. to about 110° C., a monohydroxy hydrocarbon having from 1 to about 30 carbon atoms; with (b) a mixture of zirconium tetrachloride and phosphorus pentoxide in an inert organic solvent.

9. A process of claim 8 wherein the monohydroxy hydrocarbon is alkanol.

10. A process for preparing a metal organo orthophosphate of the formula:

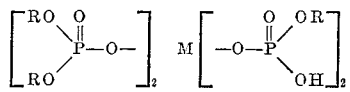

wherein M is a tetravalent metal, each R is hydrocarbyl of from 1 to about 30 carbon atoms, which comprises: (a) reacting at a temperature of from about 20° C. to about 110° C., a monohydroxy hydrocarbon having from 1 to about 30 carbon atoms; with (b) a mixture of tetravalent metal halide of the formula $MX_4$ wherein M is tetravalent metal and X is halogen and phosphorus pentoxide in an inert organic solvent.

11. A process of claim 10 wherein M is a metal having an atomic number of 22 to 40 from Group IV of the Periodic Arrangement and about 2 moles of phosphorus pentoxide and about 6 moles of the monohydroxy hydrocarbon are reacted with each mole of the tetravalent halide.

12. A process of claim 11 wherein M is titanium.

13. A process for preparing a metal organo orthophosphate of the formula:

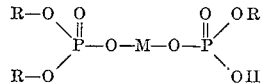

wherein each R is hydrocarbyl of from 1 to about 30 carbon atoms and M is a divalent metal which comprises: (a) contacting at a temperature of from about 20° C. to about 110° C. a monohydroxy hydrocarbon having from 1 to about 30 carbon atoms; with (b) a mixture of a divalent metal halide of the formula $MX_2$ wherein M is a metal and X is halogen and phosphorus pentoxide in an inert organic solvent.

14. A process for preparing a metal organo orthorphosphate of the formula:

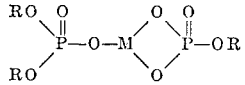

wherein R is hydrocarbyl of from 1 to about 30 carbon atoms and M is a trivalent metal which comprises: (a) contacting, at a temperature of from about 20° C. to about 110 °C. a monohydric hydrocarbon having from 1 to about 30 carbon atoms; (b) with a mixture of a metal halide of the formula $MX_3$ wherein M is a trivalent metal and X is halogen and phosphorus pentoxide in an inert organic solvent.

15. A process for preparing titanium (IV) bis[di(2-ethylhexyl) orthorphosphate] bis[monoacid mono(2-ethylhexyl) orthophosphate]; which comprises: (a) dispersing phosphorus pentoxide and titanium tetrachloride in an inert hydrocarbon solvent; (b) adding and reacting 2-ethylhexanol with the dispersion at a temperature of from about 10° C. to about 60° C.; (c) raising the temperature of the mixture to from about 80° C. to about 110° C. after addition of the 2-ethylhexanol and removing HCl formed in the reaction mixture; and (d) wherein about two moles of phosphorus pentoxide and about 6 moles of 2-ethylhexanol are reacted with each mole of titanium tetrachloride.

References Cited

UNITED STATES PATENTS

| | | | |
|---|---|---|---|
| 2,272,668 | 2/1942 | Honel | 260—933 X |
| 2,329,707 | 9/1943 | Farrington et al. | 260—429.7 X |
| 2,409,774 | 10/1964 | Mack et al. | 260—439 X |
| 2,676,975 | 4/1954 | Fortress et al. | 260—980 |
| 2,790,765 | 4/1957 | Otto et al. | 260—933 X |
| 2,790,767 | 4/1957 | Giammaria | 260—933 X |
| 2,885,417 | 5/1959 | Heyden | 260—429.5 X |
| 3,215,715 | 11/1965 | Wurstner | 260—429.7 X |
| 3,275,668 | 9/1966 | Revukas | 260—429.5 X |

TOBIAS E. LEVOW, *Primary Examiner.*

H. M. S. SNEED, *Assistant Examiner.*